United States Patent [19]

Fosness

[11] 3,955,673
[45] May 11, 1976

[54] ROTARY SHAFT PACKING REPLACEMENT KIT

[75] Inventor: Donald Edson Fosness, Bellevue, Wash.

[73] Assignee: Johns-Manville Corporation, Denver, Colo.

[22] Filed: Nov. 18, 1974

[21] Appl. No.: 524,428

[52] U.S. Cl. ............................ 206/318; 206/223; 206/303; 277/9
[51] Int. Cl.² ................. B65D 71/00; B65D 85/02; B65D 85/58
[58] Field of Search .......... 206/223, 231, 303, 318, 206/338, 445, 499; 277/9, 11, 17, 19, 59

[56] References Cited
UNITED STATES PATENTS

| | | | |
|---|---|---|---|
| 239,111 | 3/1881 | O'Meara | 206/303 |
| 657,250 | 9/1900 | Pratt | 206/303 |
| 711,024 | 10/1902 | Toy | 206/303 |
| 2,692,152 | 10/1954 | Tremolada | 206/303 X |
| 2,737,292 | 3/1956 | Neff | 206/303 |
| 2,802,568 | 8/1957 | Knox | 206/303 |
| 2,810,243 | 10/1957 | Mellowes | 206/303 X |
| 3,585,775 | 6/1971 | Stenniken | 206/303 X |

FOREIGN PATENTS OR APPLICATIONS

| | | | |
|---|---|---|---|
| 352,938 | 4/1961 | Switzerland | 206/303 |
| 1,075,106 | 7/1967 | United Kingdom | 206/318 |
| 647,417 | 8/1962 | Canada | 206/318 |
| 652,060 | 11/1962 | Canada | 206/303 |

*Primary Examiner*—Steven E. Lipman
*Attorney, Agent, or Firm*—Robert M. Krone; Joseph J. Kelly; James W. McClain

[57] ABSTRACT

A repacking kit for replacement of fluid seals for devices such as pumps is described. The kit comprises a plurality of preformed, oversized circular split rings having a specified configuration. The rings assume a helical shape around the shaft to be sealed and each is cut to size in a single step. The kit is prepacked in a quantity (generally five rings) predetermined to be that required for complete replacement of the packing of a single pump.

2 Claims, 4 Drawing Figures

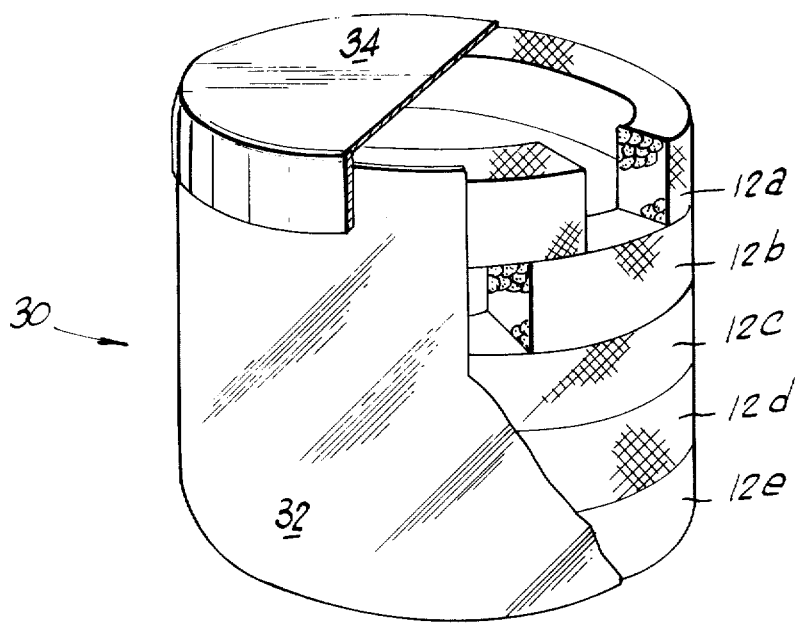

ROTARY SHAFT PACKING REPLACEMENT KIT

BACKGROUND OF THE INVENTION

The rotating shafts of pumps and other fluid-handling devices have for many years been sealed with mechanical packings consisting of preformed rings or sections of rope-like packing materials. During the course of normal operations these various packing materials become worn and must be replaced in order to maintain an acceptable seal in the equipment.

Normal maintenance practices for replacement of shaft packings can involve significant manpower and material wastage with the attendant costs, because most fluid-handling facilities (chemical process plants, oil refineries, pipelines, pumping stations, factories, etc.) use a wide variety of sizes of pumps and other fluid-handling devices. Since each different size of pump shaft and stuffing box requires a different size of packing, two alternative and potentially wasteful replacement methods have come into general use.

In the first method, split packing rings of the exact circumference required for a given pump shaft are used for replacement of the factory-installed rings. This method has the substantial disadvantage of requiring an inventory of a large number of sizes of packing rings. Further, in many cases a maintenance man will service a number of different pumps each working shift. Since he cannot normally carry with him a supply of all the different exact size packing rings which may be required during his shift, he must make numerous trips to a supply truck or warehouse to obtain the exact size rings needed for the particular job. These trips result in a large amount of nonproductive and costly man-hours.

The alternative method requires the workman to carry with him several coils of continuous rope-like packing material, the different packing ropes being of different cross-sectional sizes. At each pump, the workman cuts off a length of the rope which is supposed to be equivalent to the length of the circumference of the shaft to be sealed (see FIG. 1). In actual practice, however, the length of rope cut by the workman is rarely of the exact length needed, but rather is normally too short or too long. If the length cut is too short, the entire length is discarded and a new length cut. Often a workman tries to err on the side of convenience and thus cuts a length considerably longer than that needed, thereafter cutting off the excess. In either case, however, wastage of the product is common. In addition, rings cut from rope have a decided tendency to "keystone" or spread apart at their outer edges. Preformed rings do not do this.

OBJECTS OF THE INVENTION

It is an object of this invention to provide a replacement kit of packing material for rotary shafts which may be readily carried by a workman to the job site and speedily installed on the shaft to be sealed.

It is a further object of this invention to provide replacement packing materials which can be readily adapted to fit a variety of rotary shafts.

It is a further object of this invention to provide a kit comprising a plurality of packing rings in a quantity predetermined to be exactly that necessary to completely repack a typical pump.

It is a further object of this invention to provide replacement packing kits which can be supplied and inventoried in a small number of sizes but which will serve a wide variety of in-use applications, thus minimizing the storage, inventory, and handling of the replacement packing.

It is a further object of this invention to provide replacement packing kits which can be used by the average maintenance workman with minimal wastage of packing material.

It is a further object of this invention to provide packing rings which will not keystone.

BRIEF SUMMARY OF THE INVENTION

The objects of this invention are attained by the present invention, which is a replacement or repacking kit of oversized packing rings useful for repacking stuffing boxes surrounding rotating shafts of pumps and the like. The kit comprises a plurality of preformed, oversized circular split rings, each of which has a configuration with an inner diameter approximately the same as the maximum diameter of shaft to be sealed and a length greater than the circumference of the maximum diameter shaft to be sealed. This configuration is such that when the oversized split ring is placed in its initial position on the shaft, the split ring assumes a substantially helical configuration with the ends overlapping. These ends can then be cut in one simple step to the exact ring size required and the resulting exact size split rings readily inserted into the stuffing box. The kit is packaged to comprise the exact number of rings (generally five) required to completely repack conventional pumps.

The invention herein also comprises a method of repacking a stuffing box surrounding a rotating shaft of a pump of the like which comprises mounting on the shaft at least one preformed oversized split ring of the above-described configuration in substantially helical configuration with the ends of each ring overlapping, severing both ends of each of the rings along a single line such that each ring assumes an annular shape with the inner diameter essentially equivalent to the diameter of the shaft to be sealed, and then inserting each of the packing rings into the stuffing box so as to form a mechanical seal against the flow of liquid along the surface of the rotating shaft.

BRIEF DESCRIPTION OF THE DRAWINGS

FIG. 4 illustrates, in a partially cutaway perspective view, a prepackaged kit containing five rings.

DETAILED DESCRIPTION AND PREFERRED EMBODIMENTS

Figure 2:
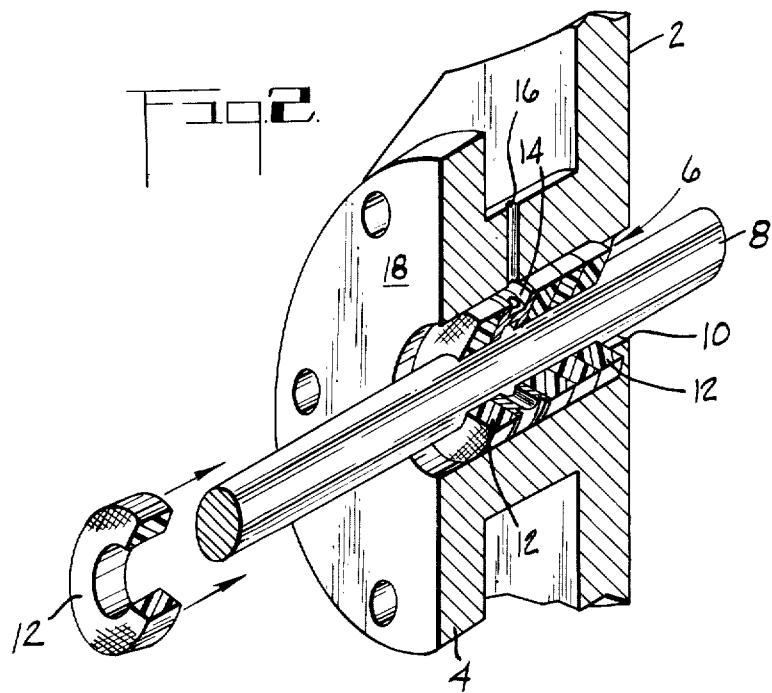
FIG. 2 is a perspective view (partially in section) illustrating a rotary shaft and its stuffing box with a number of the packing rings of the present invention assembled in position and with another packing ring shown preparatory to be inserted into the stuffing box.
Figure 3:
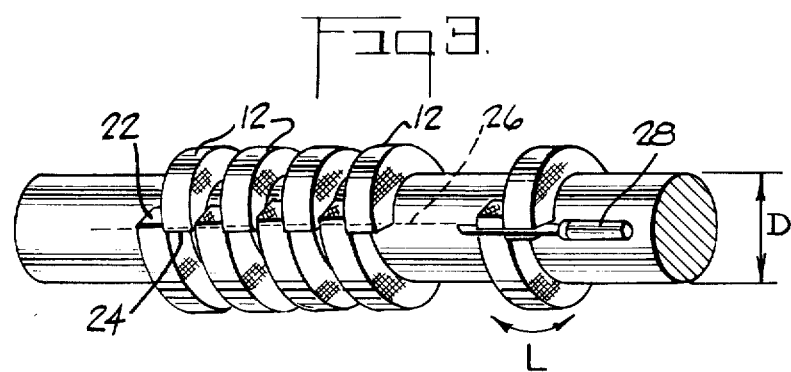
FIG. 3 is a perspective view illustrating the initial assembly of each packing ring on a shaft and also illustrating the method of this invention of cutting ring ends to size along a single line.

The invention herein can be best understood by reference to the attached drawings, particularly FIGS. 2 and 3. FIG. 2 illustrates that part of a pump casing or similar apparatus through which a rotary shaft projects. In FIG. 2, the casing wall is designated 2 with the fluid to be encased being found to the right in the view shown. A conventional flanged protrusion 4 extends outwardly from the casing wall 2. A cylindrical hole 6 extends through both the casing 2 and projection 4 and rotary shaft 8 passes through hole 6. The structure of hole 6 comprises the stuffing box. The inner lip 10 of hole 6 is of smaller diameter than the remainder of hole 6 in order to function as a stop for the packing rings to be inserted in the stuffing box. It may also serve as a bearing surface for shaft 8. The stuffing box conventionally contains a number (usually five) of packing elements or rings 12. These annular rings completely surround shaft 8 and serve to prevent the passage of the fluid from the inside of the casing to the outside along the surface of the shaft. (In the view shown in FIG. 2, a segment of each annular ring is shown removed with the remainder of the ring thus presented as having a C-shape.)

The stuffing box may also contain a lantern ring 14 which is positioned under lubrication hole 16 and is perforated so that lubricant put into hole 16 will pass through lantern ring 14 and be distributed along the surface of shaft 8. Typically one finds three packing rings disposed internally of lantern ring 14 and two packing rings disposed outwardly of lantern ring 14 in the stuffing box. Once all the packing and lantern rings are inserted in the stuffing box, a follower block (not shown) is attached to flange 18 and bolted down to compress the packing to the desired degree.

Figure 1:
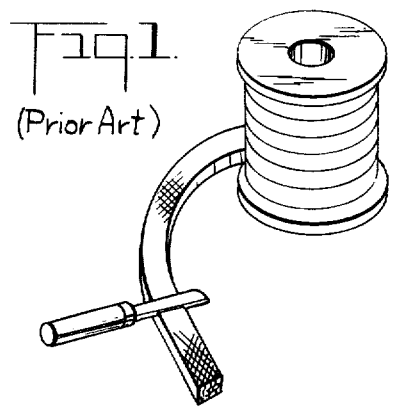
FIG. 1 illustrates the typical prior art method described above whereby a rope-like material is cut for use as a packing, as described above.

The foregoing represents conventional packing techniques. The invention herein, however, lies in a novel replacement kit for use by workmen in replacing worn packing rings and in the method of making this replacement such that a workman can readily install a superior and complete replacement seal. Once the replacement kit seals of this invention are in place and the pump casing reassembled, the rings function in the same manner as conventional packing rings. However, their advantage as replacement rings lies in their uniformity of shape and exact size required for the particular shaft being sealed, so that the resulting seal is far superior in both sealability and service life to the typical replacement seal made by the techniques of FIG. 1. It is also the equivalent in sealability and service life of those replacement seals made with exact size split rings, but has the distinct advantage of requiring a far smaller inventory of separate sizes of packing rings and greatly simplifies the task of the workman in selecting the proper size ring for the particular shaft to be sealed.

Referring now to FIG. 3, a plurality of the oversized split rings 12 comprising one embodiment of the kit herein is shown in the initial position on a shaft of diameter D. Each of the individual oversized circular split rings 12 is shown in a substantially helical configuration, the inner diameter of which is also D. Since the length L of each ring 20 is greater than D, the rings assume a substantially helical configuration in which one end 22 of the ring overlaps the other end 24. The amount of overlap will depend on the actual diameter D of the shaft and predetermined length L of the rings in the replacement kit.

In the replacement kit of this invention the diameter D of each ring in a particular kit will be sized for the largest diameter shaft for which the cross-sectional size of the rings in that kit are intended to be used. The length L of the oversized packing rings is such that it exceeds the circumference of the largest diameter shaft for which it is intended to be used so that the ends of the ring overlap for cutting as described below. It is envisioned that there will be a series of several kits, each covering an individual segment of a range of shaft diameters based on cross-sectional size. For instance, a first kit might be designated for use on shafts of from 1 inch to 1½ inch diameters. Each ring in that kit would have a nominal diameter of 1¾ inch. Since the rings are oversized and are intended to be used for shafts up to 1½ inch diameters, however, the length L of each ring will be greater than pi x 1½ inches so that there is an overlap of the ends to facilitate trimming of the rings on the larger shafts. Excessive length should be avoided, however, in order to minimize the waste of cut material. A second set of rings might then be designated to fit shafts of from 1½ inches to 2 inches in diameter, and so forth.

Installation is also illustrated in FIG. 3. The workman simply selects the kit of oversized rings designated as covering the range into which the particular shaft to be sealed falls. From this kit, he selects the number of rings required to fill the stuffing box, accounting, if necessary, for any lantern ring which may be present. Ordinarily, however, the kits will be assembled so as to contain the proper number of rings for ordinary stuffing boxes, normally 5 rings per kit. A typical kit is shown in FIG. 4. The five rings are designated 12a through 12e. These are prepacked in a container 30, in this example a plastic (generally clear) cup 32 and lid 34. This package would of course have a label affixed designating the ring size, material, type of designed service and other pertinate information printed thereon. The workman then needs to take only one kit per job. Selection of the proper size is found to be quite easy in practice, for particular shaft diameters normally use only specified cross-sectional sizes of packing rings or ropes and most workmen are quite familiar with the proper cross-sectional sizes needed. Thus, for example, where it is common to use ½ inch square packing on shafts of 3 to 3¾ inch diameter, the replacement kits of the present invention may be labeled accordingly and can be readily selected by the workmen. The rings are placed around the shaft, assuming the helical configuration shown in FIG. 3. One or more rings can be initially placed on the shaft, depending on the amount of clearance available. The ends of each ring are then severed along line 26 by suitable means such as knife 28. Each ring may have its two ends severed separately from severing any other rings or it may be found more convenient to sever the ends of two or more rings simultaneously. Each ring will after cutting tend to assume an annular configuration and may be slid into the stuffing box as shown in FIG. 2. Since each of the annular rings virtually completely surrounds the shaft leaving only a minimal slit between ends, the rings operate in virtually the same manner as rings preformed to the exact shaft diameter. Following severing of the ring ends the rings must be rotated so that the slit between cut ends of the various rings lie other than on line 26, so that the rings in the stuffing box present a staggered line of cut ends. After the rings are emplaced in the stuffing box, the follower is attached and tightened down to the desired pressure in the conventional manner.

The replacement kit packing rings of this invention may be made of any conventional packing material. Of course, those replacement kits intended for replacement of packing in specific type of service will be made of the same material as the original packing. Base materials for the packing may be such materials as flax, ramie, asbestos, fluorocarbon filament, or similar fibrous or filamentary materials. These, in turn, may be impregnated with any of the conventional impregnants, including petroleum-base oils and waxes, animal fats, greases, fluorocarbon compounds, and various alkali and/or acid-resistant lubricants.

The packings of this invention will find use as replacements for original packings in such apparatus as centrifugal pumps, valve stems, reciprocating pumps, and pistons.

What I claim is:

1. A repacking kit for the replacement of mechanical packing surrounding a rotating shaft which comprises a plurality of preformed, oversized circular split rings, each of which has a configuration with an inner diameter approximately the same as the maximum diameter of the shaft to be sealed and a length greater than the circumference of the maximum diameter shaft to be sealed, said configuration being such that when each ring is initially placed in position on a shaft the ring assumes a helical configuration with its ends overlapping for simultaneous severing of both ends along a single line.

2. The kit of claim 1 wherein said plurality of rings comprises five rings.

* * * * *